(12) United States Patent
Matsunobu (10) Patent No.: US 11,922,596 B2
(45) Date of Patent: Mar. 5, 2024

(54) DISPLAY CONTROL DEVICE FOR VEHICLE, DISPLAY METHOD, AND NON-TRANSITORY COMPUTER READABLE RECORDING MEDIUM RECORDING DISPLAY PROGRAM

(71) Applicant: TOYOTA JIDOSHA KABUSHIKI KAISHA, Toyota (JP)

(72) Inventor: Go Matsunobu, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/824,357

(22) Filed: May 25, 2022

(65) Prior Publication Data

US 2023/0013991 A1 Jan. 19, 2023

(30) Foreign Application Priority Data

Jul. 15, 2021 (JP) ................. 2021-117434

(51) Int. Cl.
*G06T 3/40* (2006.01)
*B60K 35/00* (2006.01)
*B60W 50/14* (2020.01)
*G01C 21/36* (2006.01)
*G06T 11/00* (2006.01)

(52) U.S. Cl.
CPC ............... *G06T 3/40* (2013.01); *B60K 35/00* (2013.01); *G06T 11/00* (2013.01); *B60K 2370/1529* (2019.05); *B60K 2370/168* (2019.05); *B60K 2370/175* (2019.05); *B60K 2370/177* (2019.05); *B60K 2370/179* (2019.05); *B60K 2370/184* (2019.05); *B60K 2370/52* (2019.05); *B60W 50/14* (2013.01); *B60W 2050/146* (2013.01); *G01C 21/365* (2013.01); *G06T 2219/2016* (2013.01); *G09G 2380/10* (2013.01)

(58) Field of Classification Search
CPC ... G06T 3/40; G06T 11/00; G06T 2219/2016; B60K 35/00; B60K 2370/1529; B60K 2370/168; B60K 2370/52; B60K 2370/175; B60K 2370/177; B60K 2370/179; B60K 2370/184; G09G 2380/10; B60W 50/14; B60W 2050/146; G01C 21/365
See application file for complete search history.

(56) References Cited

U.S. PATENT DOCUMENTS

| | | | |
|---|---|---|---|
| 2018/0286094 A1* | 10/2018 | Shishido | G02B 27/0101 |
| 2019/0139298 A1* | 5/2019 | Cho | G02B 27/0101 |
| 2022/0058885 A1* | 2/2022 | Lee | G02B 27/0172 |

FOREIGN PATENT DOCUMENTS

| | | |
|---|---|---|
| JP | 2017-21019 | 1/2017 |
| JP | 2018-20779 | 2/2018 |
| WO | WO2017/046937 A1 | 3/2017 |

* cited by examiner

*Primary Examiner* — Douglas M Wilson
(74) *Attorney, Agent, or Firm* — Oblon, McClelland, Maier & Neustadt, L.L.P.

(57) ABSTRACT

A display control device for a vehicle that is configured to: detect a target ahead of a vehicle; set an apparent angle of a marker relative to a reference plane in accordance with a distance between the target and the vehicle, the reference plane being related to a road surface on which the vehicle is traveling; and display the marker so as to be superimposed on the target as viewed by a driver of the vehicle.

8 Claims, 10 Drawing Sheets

DISPLAY CONTROL DEVICE FOR VEHICLE, DISPLAY METHOD, AND NON-TRANSITORY COMPUTER READABLE RECORDING MEDIUM RECORDING DISPLAY PROGRAM

CROSS-REFERENCE TO RELATED APPLICATION

This application is based on and claims priority under 35 USC 119 from Japanese Patent Application No. 2021-117434 filed on Jul. 15, 2021, the disclosure of which is incorporated by reference herein.

BACKGROUND

Technical Field

The present disclosure relates to a display control device for a vehicle, a display method, and a non-transitory computer readable recording medium recording a display program.

Related Art

International Publication No. WO2017/046937 discloses a technology relating to a display device for a vehicle. During automatic cruise control operations, this display device for a vehicle displays tracking marks superimposed on other vehicles, which are tracking objects (targets) of the present vehicle, in a head-up display.

However, in International Publication No. WO2017/046937, as the distance between another vehicle and the present vehicle decreases, the tracking mark is made smaller, and as the distance between the another vehicle and the present vehicle increases, the tracking mark is made larger. As a result, in International Publication No. WO2017/046937, sizes of the tracking mark as seen by a driver of the present vehicle are not proportional to distances between the present vehicle and the another vehicle. Therefore, the driver of the present vehicle is likely to have difficulty attaining a sense of distance between the present vehicle and the another vehicle.

SUMMARY

An aspect of the present disclosure is a display control device for a vehicle, the display control device includes: a memory; and a processor connected to the memory, the processor being configured to: detect a target ahead of a vehicle; set an apparent angle of a marker relative to a reference plane in accordance with a distance between the target and the vehicle, the reference plane being related to a road surface on which the vehicle is traveling; and display the marker so as to be superimposed on the target as viewed by a driver of the vehicle.

DETAILED DESCRIPTION

Below, an example of an embodiment of the display control device for a vehicle according to the present disclosure is described using FIG. 1 to FIG. 10. A vehicle display control device 10 (below referred to as the display control device 10) according to the present exemplary embodiment constitutes a portion of a vehicle display apparatus 14 (below referred to as the display apparatus 14) mounted in a vehicle 12.

Figure 1:
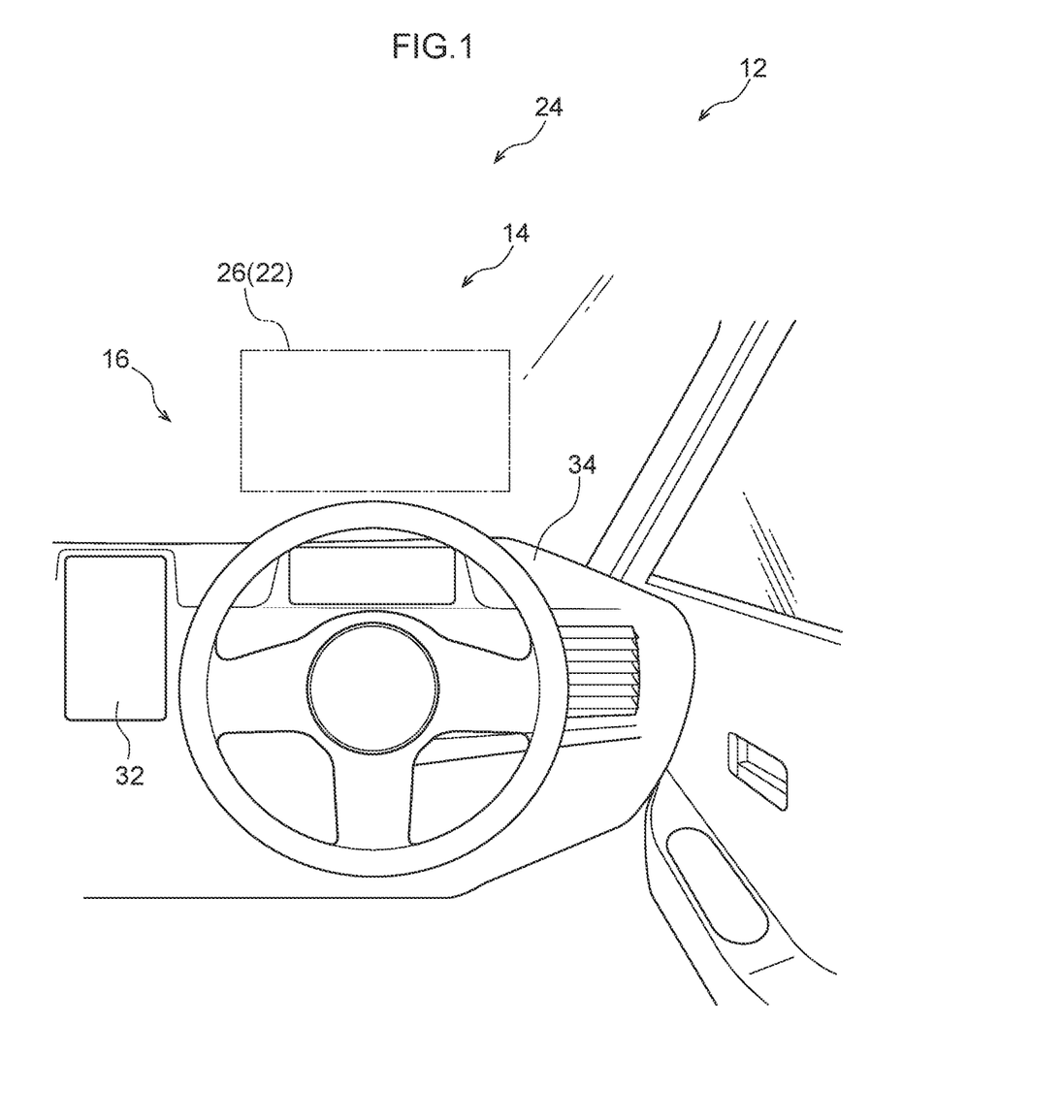
FIG. 1 is a view, seen from a vehicle rear side, showing an example of structures of a driver seat vicinity of a vehicle that is equipped with a vehicle display control device according to a present exemplary embodiment.

As shown in FIG. 1, the vehicle 12 according to the present exemplary embodiment is a right-hand drive vehicle. A seat on which a driver sits is disposed in a vehicle width direction right side region at the vehicle front side of a cabin 16.

Figure 2:
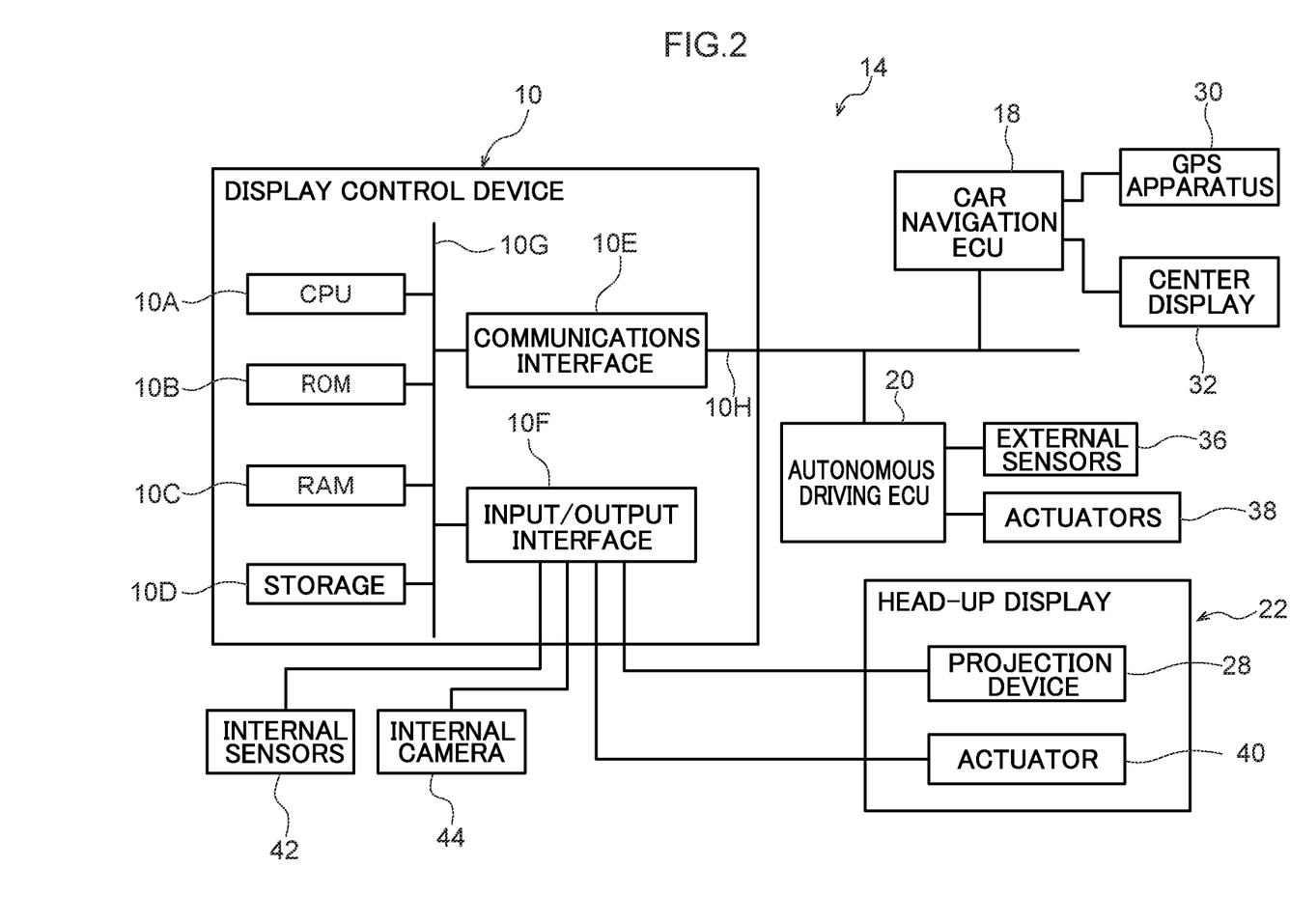
FIG. 2 is a block diagram showing an example of hardware structures of the vehicle equipped with the vehicle display control device according to the present exemplary embodiment.

As shown in FIG. 2, in addition to the display control device 10, the display apparatus 14 is equipped with a car navigation electronic control unit (ECU) 18 (below referred to as the ECU 18), an autonomous driving ECU 20 (below referred to as the ECU 20), and a head-up display 22.

More specifically, the ECU 18 is connected to be capable of communications with the display control device 10, and is capable of controlling a car navigation system. A global positioning system (GPS) apparatus 30 and a center display 32 are electronically connected to the ECU 18. The ECU 18 is capable of specifying a running path to a destination specified by entry operations by the driver.

The GPS apparatus 30 is a device that measures a current position of the vehicle 12. The GPS apparatus 30 is equipped with an antenna that receives signals from GPS satellites. The GPS apparatus 30 may be connected to the display control device 10 directly.

The center display 32 is a liquid crystal display screen. The center display 32 is disposed at a vehicle width direction central portion of a dashboard 34 that is disposed to the vehicle front side of the seat. The center display 32 is capable of displaying a map M and a marker P that indicates the current position of the vehicle 12 acquired by the GPS apparatus 30 (see FIG. 10).

The ECU 20 is connected to be capable of communications with the display control device 10, and is capable of controlling an autonomous driving system. External sensors 36 and driving actuators 38 are electronically connected to the ECU 20.

More specifically, the external sensors 36 are a group of sensors that are used for detecting the environment surrounding the vehicle 12. The external sensors 36 include an external camera that images a predetermined range, a millimeter-wave radar that transmits scanning waves over a predetermined range, a lidar (laser imaging detection and ranging) that scans a predetermined range, and so forth. Data acquired by the internal sensors 36 is sent to the display control device 10 by the ECU 20. The external sensors 36 may be connected to the display control device 10 directly.

The driving actuators 38 are provided with respective steering actuators, a brake actuator and a power unit actuator. The steering actuators include motors and drive a steering apparatus in accordance with signals outputted from the ECU 20. During autonomous driving, control by the ECU 20 is applied to steering angles of steered wheels.

The brake actuator includes a motor and drives a braking apparatus in accordance with signals outputted from the ECU 20. During autonomous driving, control by the ECU 20 is applied to decelerations of the vehicle 12.

The power unit actuator includes a motor and drives a power unit in accordance with signals outputted from the ECU 20. During autonomous driving, control by the ECU 20 is applied to driving of the vehicle 12. When a preceding vehicle is running at the front side of the vehicle 12, the ECU 20, the external sensors 36 and the driving actuators 38 are capable of functioning as an automatic cruise control system.

The head-up display 22 is provided with a display surface 26, a projection device 28 and an adjustment actuator 40. The display surface 26 is connected to be capable of communications with the display control device 10, and structures a portion of a front windshield 24 that is disposed to the vehicle front side of the seat. The projection device 28 projects moving images onto the display surface 26. The adjustment actuator 40 adjusts the projection device 28.

More specifically, by illuminating light beams based on signals outputted from the display control device 10 towards the display surface 26, the projection device 28 is capable of generating virtual images that are visible to the driver. The adjustment actuator 40 is a driving device for adjusting an angle of a reflecting mirror, which reflects the light beams illuminated from the projection device 28, in accordance with signals outputted from the display control device 10 and for adjusting relative positions of the reflecting mirror and the projection device 28.

Now, structures of the display control device 10 are described. The display control device 10 includes a central processing unit (CPU) 10A that serves as a hardware processor, read-only memory (ROM) 10B, random access memory (RAM) 10C, storage 10D, a communications interface (I/F) 10E, and an input/output interface 10F. The CPU 10A, ROM 10B, RAM 10C, storage 10D, communications interface 10E and input/output interface 10F are connected with one another to be capable of communications via an internal bus 10G.

The CPU 10A is an arithmetic processing unit and is capable of controlling various kinds of equipment by loading and executing various programs. More specifically, the CPU 10A is capable of reading a program from the ROM 10B and executing the program, using the RAM 10C as a work area. When an executable program memorized in the ROM 10B is loaded and executed by the CPU 10A, the display control device 10 is capable of manifesting various functions as described below.

More specifically, various programs and various kinds of data are memorized in the ROM 10B. These programs and data relate to acquiring relationships between targets and the vehicle 12, which are described below, controlling the head-up display 22, detecting an eyeline direction of the driver, generating a virtual space, and so forth. Meanwhile, the RAM 10C is capable of serving as a work area and temporarily memorizing programs and data.

The storage 10D is structured with a hard disk drive (HDD) or solid-state drive (SSD). The storage 10D is capable of memorizing various programs, including an operating system, and various kinds of data, such as a vehicle profile estimation model and a three-dimensional map information model, which are described below.

The communications interface 10E is an interface used for communications with the display control device 10 and various kinds of equipment mounted in the vehicle 12. The communications interface 10E employs a communications standard in accordance with the CAN protocol. The communications interface 10E is connected to the ECU 18 and the ECU 20 via an external bus 10H.

The input/output interface 10F is an interface for connecting the display control device 10 to be capable of communications with various kinds of equipment mounted in the vehicle 12. The display control device 10 is connected via the input/output interface 10F to be capable of two-way communications with the head-up display 22 described above and with each of internal sensors 42 and an internal camera 44.

The internal sensors 42 are a sensor group used for detecting running states of the vehicle 12. The internal sensors 42 are provided with a speed sensor, an acceleration sensor and a yaw rate sensor. Data acquired by the internal sensors 42 is memorized at the storage 10D.

The internal camera 44 is provided in a region at the vehicle upper side of the vehicle front side of the cabin 16. The internal camera 44 is capable of acquiring video images of the face of the driver. Video image data acquired by the internal camera 44 is sent to the display control device 10.

Figure 3:
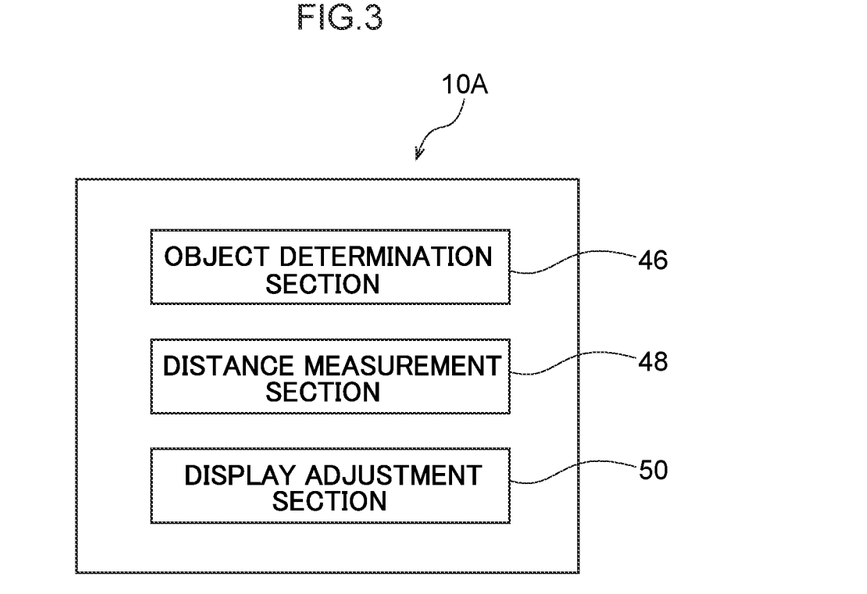
FIG. 3 is a block diagram showing an example of functional structures of a CPU of the vehicle display control device according to the present exemplary embodiment.

Now, using FIG. 2, functional structures of the display control device 10 are described. By the CPU 10A loading and executing an execution program memorized in the ROM 10B, the display control device 10 functions as an assemblage of an object determination section 46, a distance measurement section 48 and a display adjustment section 50. In the present exemplary embodiment, in accordance with entry operations by the driver, a display state of the head-up display 22 may be switched into either or both of a following distance monitoring mode and a driving assistance mode.

In the following distance monitoring mode, the object determination section 46 may determine whether or not an object located to the vehicle front side of the vehicle 12 is a vehicle on the basis of information acquired from the external sensors 36 and the vehicle profile estimation model memorized in the storage 10D. That is, in the following distance monitoring mode, the object determination section 46 may detect a preceding vehicle 52 (see FIG. 4) as a target.

In accordance with changes in settings, the object determination section 46 may detect moving objects such as walkers, bicycles, balls and so forth as targets. However, in the following distance monitoring mode, the object determination section 46 excludes static objects such as vehicles in non-moving states and the like from being targets.

More specifically, three-dimensional models of various types of vehicles are stored in the vehicle profile estimation model. Information acquired by the external camera, lidar and the like of the external sensors 36 is inputted into the vehicle profile estimation model, and the vehicle profile estimation model outputs a three-dimensional shape of a vehicle corresponding to this information.

In the driving assistance mode, the object determination section 46 may determine whether or not a predetermined location on a running path is visible in video images acquired by the external camera of the external sensors 36, on the basis of information acquired by the external camera, a running path of the vehicle 12 acquired from the ECU 18, position information of the vehicle 12 acquired from the GPS apparatus 30 via the ECU 18, and the three-dimensional map model memorized in the storage 10D In other words, in the driving assistance mode, the object determination section 46 may detect the predetermined location on the running path as a target. In the present exemplary embodiment, as an example, this predetermined location is specified to be a course change position 54 on the running path of the vehicle 12.

The distance measurement section 48 is capable of measuring a distance between a target and the vehicle 12. In more detail, in the following distance monitoring mode, the distance measurement section 48 measures a distance between the preceding vehicle 52 and the vehicle 12 on the basis of data obtained from the external sensors 36. The distance measurement section 48 is capable of estimating a progress direction of the preceding vehicle 52 on the basis of changes in the distance between the preceding vehicle 52 and the vehicle 12 at predetermined time intervals (relative speed of the preceding vehicle 52 and the vehicle 12) and data acquired by the internal sensors 42.

In the driving assistance mode, the distance measurement section 48 measures a distance between a predetermined location on a running path and the vehicle 12 on the basis of information acquired from the external sensors 36.

Figure 4:
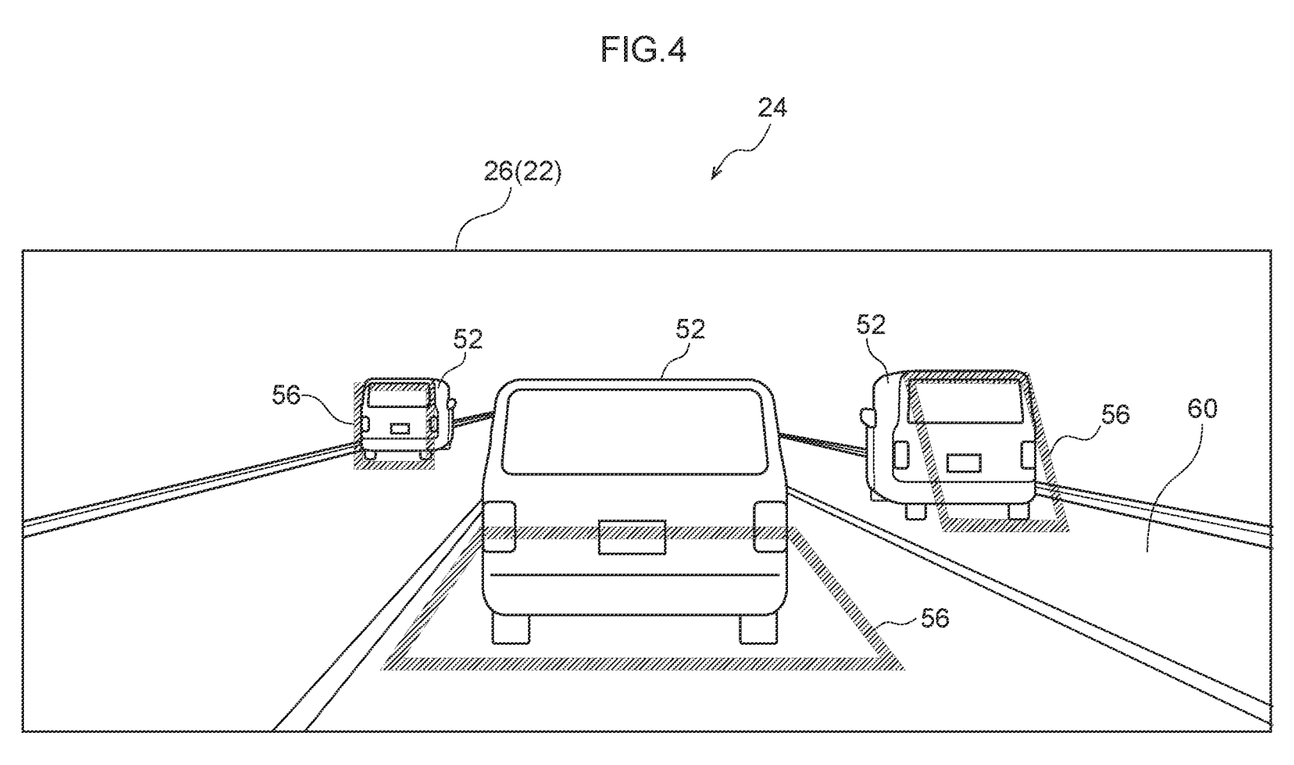
FIG. 4 is an image view showing an example of a display of markers on moving targets that is implemented by the vehicle display control device according to the present exemplary embodiment.

In the following distance monitoring mode, the display adjustment section 50 is capable of controlling the head-up display 22 and, as illustrated in FIG. 4, displaying a marker 56 on the display surface 26 such that, as seen by the driver, the marker 56 is superimposed on the preceding vehicle 52, which can be seen through the display surface 26.

The display adjustment section 50 detects an eyeline direction of the driver on the basis of video images acquired by the internal camera 44. On the basis of this eyeline direction and position information of the vehicle 12 and preceding vehicle 52 in the aforementioned virtual space, the display adjustment section 50 makes a determination as to whether the preceding vehicle 52 is located in the display surface 26 as seen by the driver.

When the display adjustment section 50 determines that the preceding vehicle 52 is located in the display surface 26 as seen by the driver, the display adjustment section 50 sets a position of the marker 56 in the display surface 26 to a position that is superimposed on the preceding vehicle 52 as seen by the driver, and displays the marker 56 on the display surface 26. On the other hand, when the display adjustment section 50 determines that the preceding vehicle 52 is not located in the display surface 26 as seen by the driver, the display adjustment section 50 does not display the marker 56 on the display surface 26.

More specifically, the display adjustment section 50 is capable of generating a virtual space in a predetermined range centered on the vehicle 12 on the basis of the position information of the vehicle 12 acquired from the GPS apparatus 30, the three-dimensional map information model memorized in the storage 10D, and three-dimensional information of the preceding vehicle 52 acquired from the vehicle profile estimation model memorized in the storage 10D.

Figure 5:
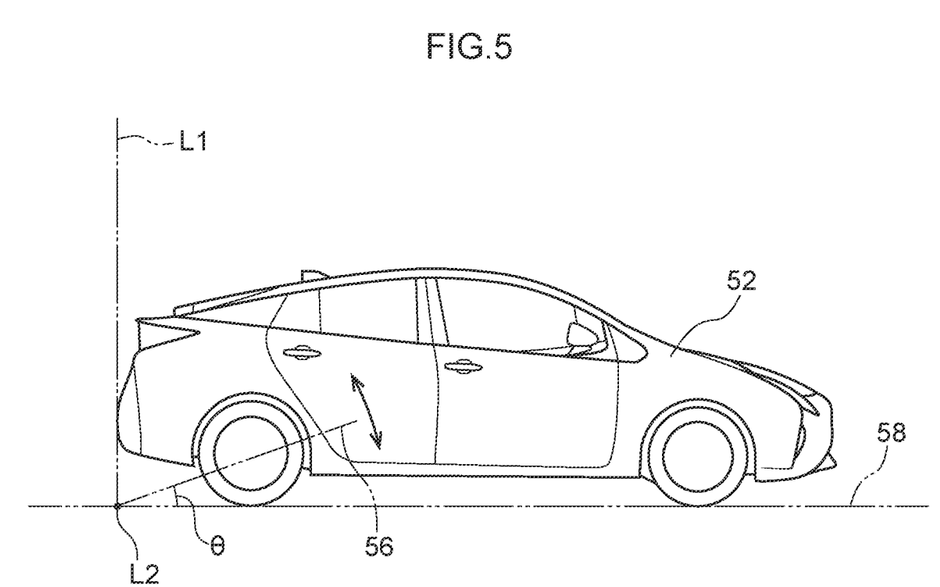
FIG. 5 is an image view showing an example of display processing of a marker on a moving target that is implemented by the vehicle display control device according to the present exemplary embodiment.

The display adjustment section 50 sets the shape of the marker 56 in the virtual space to a rectangular frame that surrounds the profile of the preceding vehicle 52 when the preceding vehicle 52 is seen from the vehicle rear side thereof. Then, as illustrated in FIG. 5, the display adjustment section 50 rotates the marker 56 around a straight line L2 in the virtual space in accordance with the distance between the vehicle 12 and the preceding vehicle 52. Viewed in a vehicle width direction of the preceding vehicle 52, a straight line L1 passes through a rear end portion (a progress direction rear side end portion) of the preceding vehicle 52 and is orthogonal to a virtual road surface 58. The straight line L2 passes through an intersection point between the straight line L1 and the virtual road surface 58 and extends in the vehicle width direction of the preceding vehicle 52.

In more detail, the display adjustment section 50 changes an index angle θ in the vertical space continuously in accordance with distances between the vehicle 12 and the preceding vehicle 52. The index angle θ is the angle formed between the marker 56 and the virtual road surface 58 when the preceding vehicle 52 is viewed in the vehicle width direction thereof.

The magnitude of the index angle θ is at most a right angle, the index angle θ decreases as the distance between the vehicle 12 and the preceding vehicle 52 shortens, and the index angle θ increases as the distance between the vehicle 12 and the preceding vehicle 52 lengthens. When the distance between the vehicle 12 and the preceding vehicle 52 is at least a predetermined distance (for example, 100 m or greater), the display adjustment section 50 sets the index angle θ to the right angle. When the preceding vehicle 52 is located just in front of the vehicle 12, the display adjustment section 50 sets the index angle θ to 0°.

The display adjustment section 50 also changes the size of the marker 56 displayed on the display surface 26 in accordance with distances between the vehicle 12 and the preceding vehicle 52. Thus, the display adjustment section 50 controls the head-up display 22 such that the size of the marker 56 is constant relative to the preceding vehicle 52 in the display surface 26 when a distance between the vehicle 12 and the preceding vehicle 52 is constant. Note that the controls described above may be implemented using vehicle-to-vehicle times between the vehicle 12 and the preceding vehicle 52 as an index instead of distances between the vehicle 12 and the preceding vehicle 52.

The display adjustment section 50 applies relationships between the vehicle 12, the preceding vehicle 52 and the marker 56 in the virtual space and an eyeline direction of the driver detected by the internal camera 44 to the marker 56 displayed on the display surface 26. Thus, the display adjustment section 50 sets an apparent angle of the marker 56 relative to a road surface 60 on which the vehicle 12 is running, which serves as a reference plane. That is, when the driver sees the display surface 26, an angle formed between the road surface 60 and the marker 56 appears to the driver to be the index angle θ. Various planes may be employed as the reference plane that is the reference for the apparent angle of the marker 56, provided the reference plane is related to the road surface 60, such as a predetermined plane extending orthogonally to the road surface 60 in the vehicle width direction and vehicle vertical direction of the vehicle 12, or the like.

In the present exemplary embodiment, as described above, the marker 56 on the display surface 26 is rotated about an axis in the vehicle width direction at the progress direction rear side of the preceding vehicle 52. Therefore, as illustrated in FIG. 4, a spacing between the marker 56 and the road surface 60 basically increases toward the progress direction front side of the preceding vehicle 52.

As a result, according to the present exemplary embodiment, the driver may estimate the progress direction of the preceding vehicle 52 by ascertaining an inclination of the marker 56 relative to the road surface 60. For example, if the preceding vehicle 52 is reversing toward the vehicle 12, the driver may ascertain that the preceding vehicle 52 is reversing by seeing that the spacing between the marker 56 and the road surface 60 increases toward the vehicle rear side of the preceding vehicle 52.

Figure 6:
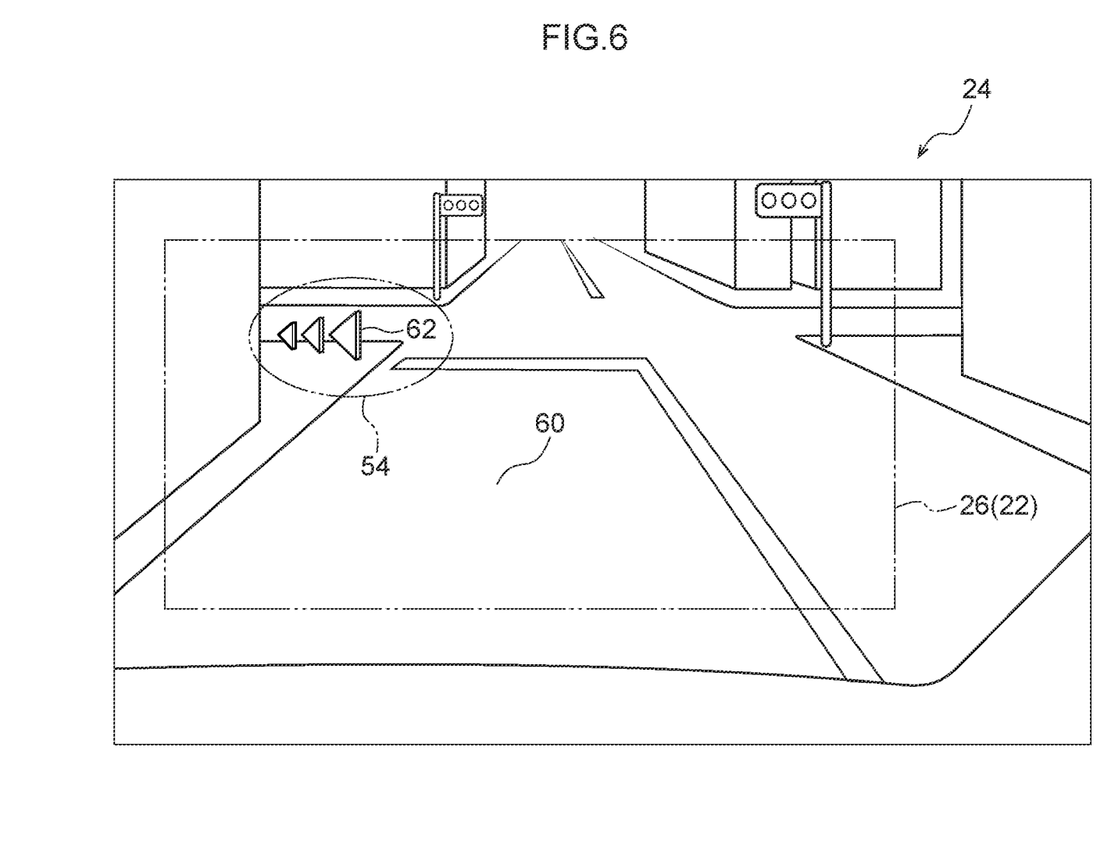
FIG. 6 is an image view showing an example of a display of a marker on a static target at least a predetermined distance apart from the vehicle that is implemented by the vehicle display control device according to the present exemplary embodiment.

In the driving assistance mode, the display adjustment section 50 performs basically similar control to the following distance monitoring mode. As illustrated in FIG. 6, the display adjustment section 50 is capable of displaying a marker 62 on the display surface 26 so as to be superimposed on the course change position 54 as seen by the driver.

In more detail, on the basis of the running path of the vehicle 12, position information of the vehicle 12 and the three-dimensional map information model, the display adjustment section 50 may set a shape of the marker 62 in the virtual space to a shape indicating a progress direction of the vehicle 12 at the course change position 54. To be more specific, the shape of the marker 62 is set to a plural number of triangles that are smaller toward a progress direction front side of the vehicle 12 and are arrayed in that progress direction.

Figure 7:
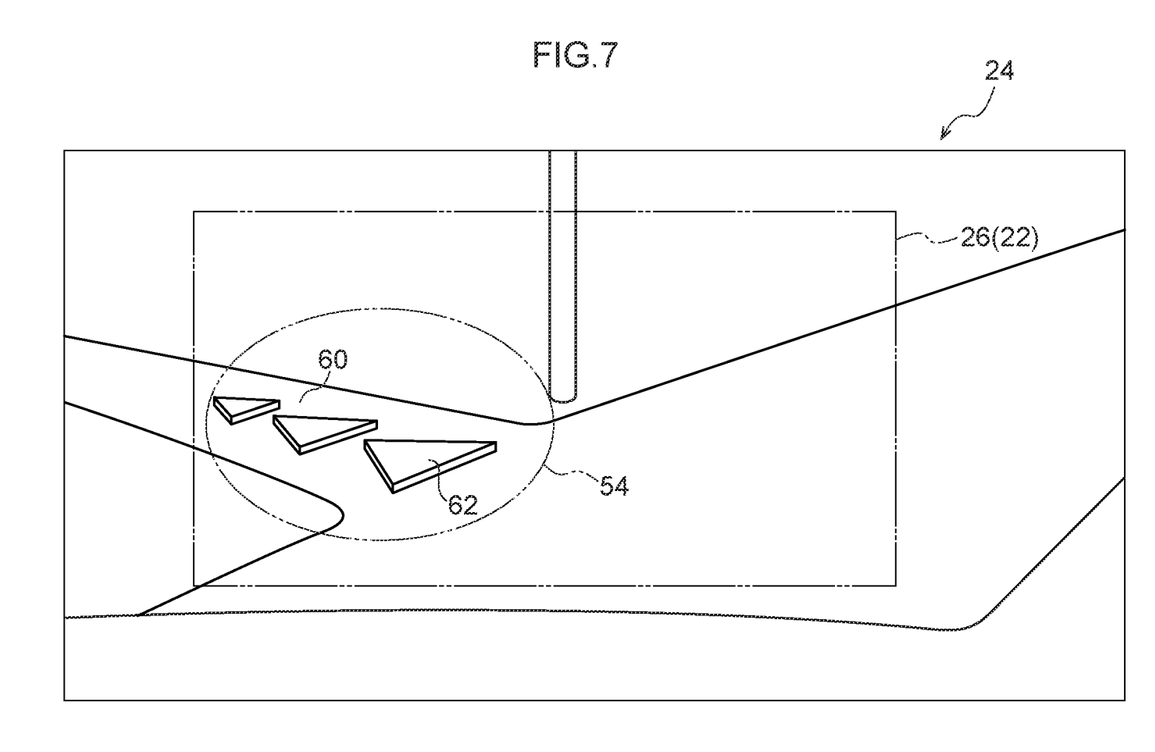
FIG. 7 is an image view showing an example of a display of the marker on the static target in a state in which the vehicle is close to the static target that is implemented by the vehicle display control device according to the present exemplary embodiment.

In the driving assistance mode, the size of the marker 62 relative to the preceding vehicle 52 and apparent angle of the marker 62 relative to the road surface 60 in the display surface 26 are set in basically the same manner as in the following distance monitoring mode. However, the driving assistance mode differs from the following distance monitoring mode in that, when the vehicle 12 moves closer to the course change position 54, the marker 62 is specified so as to rotate toward the progress direction front side of the vehicle 12 before the vehicle 12 reaches the course change position 54, as illustrated in FIG. 7.

Operation and Effects of the Present Exemplary Embodiment

Now, operation and effects of the present exemplary embodiment are described.

Figure 8:
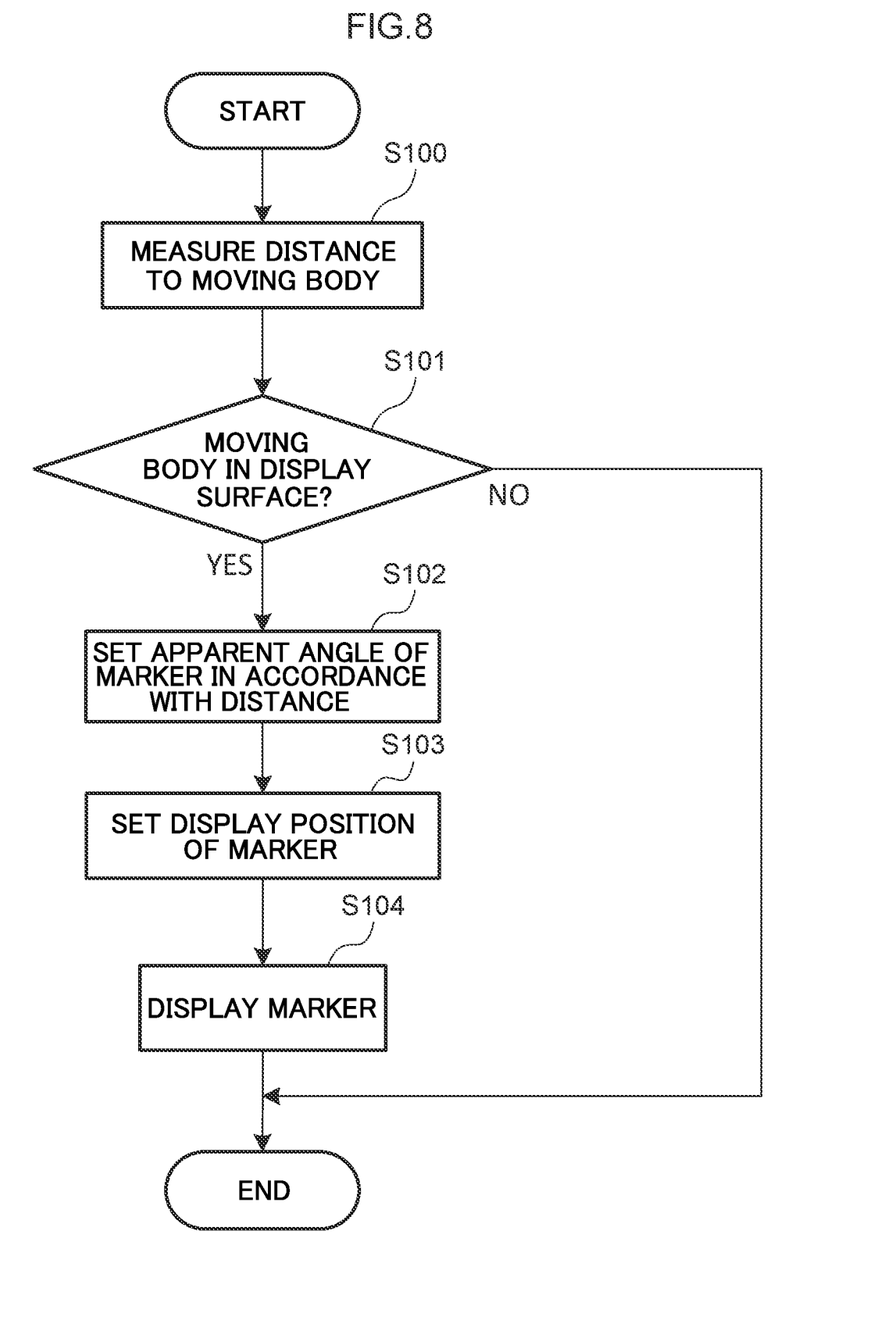
FIG. 8 is a flowchart showing an example of processing for a moving target that is implemented by the vehicle display control device according to the present exemplary embodiment.

First, a control flow relating to processing by the display control device 10 in the following distance monitoring mode is described, principally using the flowchart shown in FIG. 8. This control flow is started at predetermined time intervals when the CPU 10A of the display control device 10 receives predetermined control signals.

When the control flow is started, in step S100, the CPU 10A functions as the object determination section 46 and the distance measurement section 48, detects the preceding vehicle 52 to the vehicle front of the vehicle 12, measures the distance between the vehicle 12 and the preceding vehicle 52, and proceeds to step S101.

In step S101, the CPU 10A functions as the display adjustment section 50 and makes a determination as to whether or not the preceding vehicle 52 is located in the display surface 26 as seen by the driver. Then, if the result of the determination is that the preceding vehicle 52 is located in the display surface 26 as seen by the driver ("YES" in step S101), the CPU 10A proceeds to step S102. On the other hand, if the result of the determination is that the preceding vehicle 52 is not located in the display surface 26 as seen by the driver ("NO" in step S101), the CPU 10A ends this control flow.

In step S102, the CPU 10A functions as the display adjustment section 50, sets an apparent angle of the marker 56 relative to the road surface 60 in accordance with the distance between the vehicle 12 and the preceding vehicle 52, and proceeds to step S103.

In step S103, the CPU 10A functions as the display adjustment section 50, sets a display position of the marker 56 in the display surface 26, and proceeds to step S104.

In step S104, the CPU 10A functions as the display adjustment section 50, displays the marker 56 on the display surface 26 in accordance with the apparent angle of the marker 56 set in step S102 and the display position of the marker 56 set in step S103, and ends this control flow.

Figure 9:
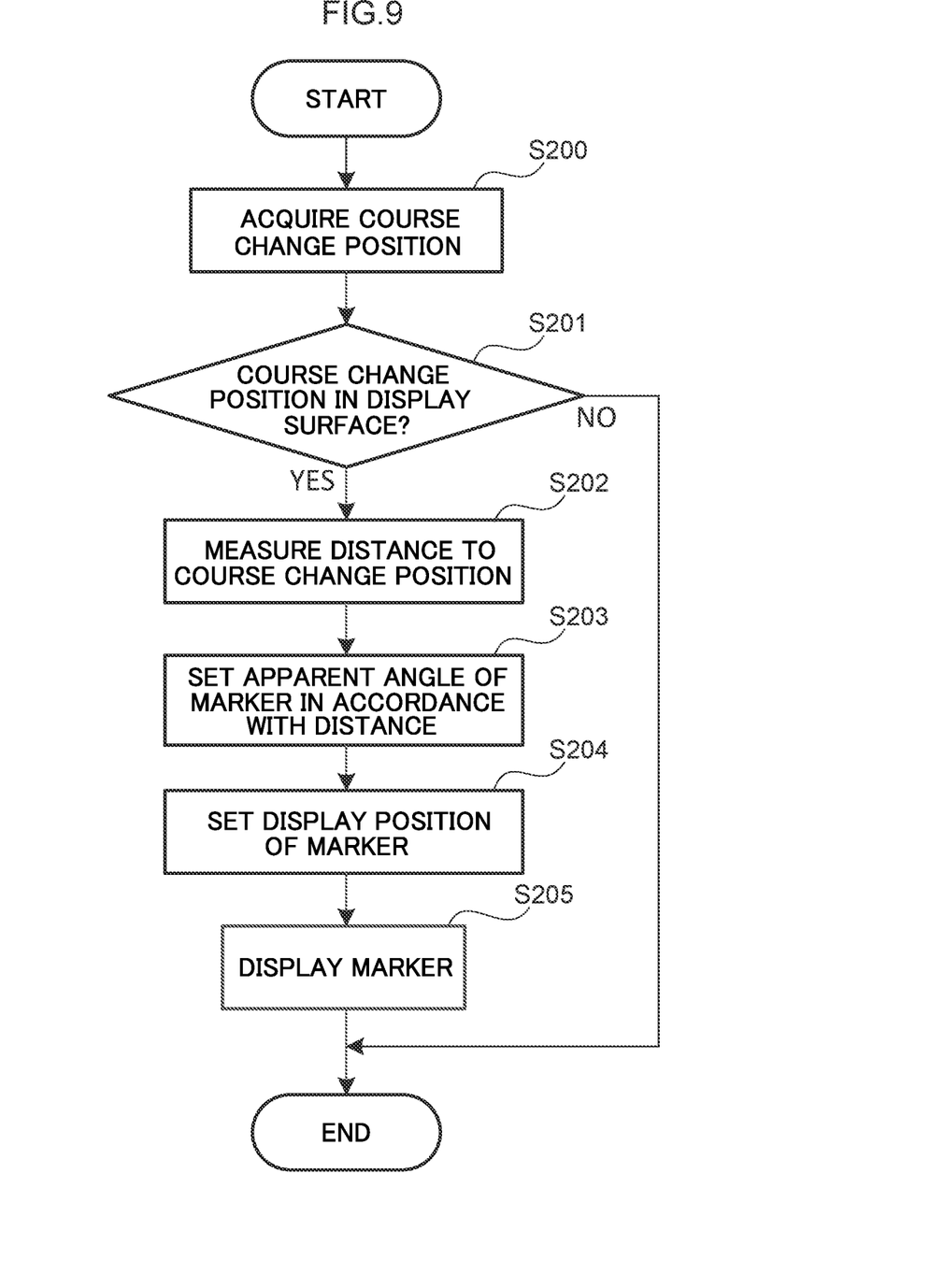
FIG. 9 is a flowchart showing an example of processing for a static target that is implemented by the vehicle display control device according to the present exemplary embodiment.

Now, a control flow relating to processing by the display control device 10 in the driving assistance mode is described, principally using the flowchart shown in FIG. 9. This control flow is started at predetermined time intervals when the CPU 10A of the display control device 10 receives predetermined control signals.

When the control flow is started, in step S200, the CPU 10A functions as the object determination section 46, detects the course change position 54 as a target, and proceeds to step S201.

In step S201, the CPU 10A functions as the display adjustment section 50 and makes a determination as to whether or not the course change position 54 is located in the display surface 26 as seen by the driver. Then, if the result of the determination is that the course change position 54 is located in the display surface 26 as seen by the driver ("YES" in step S201), the CPU 10A proceeds to step S202. On the other hand, if the result of the determination is that the course change position 54 is not located in the display surface 26 as seen by the driver ("NO" in step S201), the CPU 10A ends this control flow.

In step S202, the CPU 10A functions as the distance measurement section 48, measures the distance between the vehicle 12 and the course change position 54, and proceeds to step S203.

In step S203, the CPU 10A sets an apparent angle of the marker 62 relative to the road surface 60 in accordance with the distance between the vehicle 12 and the course change position 54, and proceeds to step S204.

In step S204, the CPU 10A functions as the display adjustment section 50, sets a display position of the marker 62 in the display surface 26, and proceeds to step S205.

In step S205, the CPU 10A functions as the display adjustment section 50, displays the marker 62 on the display surface 26 in accordance with the apparent angle of the marker 62 set in step S203 and the display position of the marker 62 set in step S204, and ends this control flow.

In the present exemplary embodiment, as illustrated in FIG. 4, the CPU 10A sets the reference plane to the road surface 60 on which the vehicle 12 is running, and sets the apparent angle of the marker 56 relative to the reference plane to the index angle $\theta$ whose magnitude is not more than the right angle and that is the angle to be formed between the marker 56 and the road surface 60.

As the distance between the vehicle 12 and the preceding vehicle 52 shortens, the CPU 10A reduces the index angle θ, and as the distance between the vehicle 12 and the preceding vehicle 52 lengthens, the CPU 10A increases the index angle θ. Consequently, in the present exemplary embodiment, distances from the vehicle 12 to the preceding vehicle 52 may be represented by the marker 56 with effects on visibility of the marker 56 being suppressed.

Now, in a situation in which no threshold is set for the distance between the vehicle 12 and the preceding vehicle 52, when the index angle θ is changed in accordance with the distance between the vehicle 12 and the preceding vehicle 52, changes in the index angle θ with respect to changes in the distance are small. Thus, the driver could have difficulty attaining a sense of distance between the vehicle 12 and the preceding vehicle 52.

In the present exemplary embodiment, the CPU 10A sets the index angle θ to the right angle when the distance between the vehicle 12 and the preceding vehicle 52 is at least the predetermined distance. Therefore, the driver sees a state in which the index angle is the right angle when the distance between the vehicle 12 and the preceding vehicle 52 is the predetermined distance or greater. Thus, the driver may perceive that the distance between the vehicle 12 and the preceding vehicle 52 is the predetermined distance or greater.

When the distance between the vehicle 12 and the preceding vehicle 52 is less than the predetermined distance, amounts of change of the index angle θ with respect to changes in the distance between the vehicle 12 and the preceding vehicle 52 are assured. Thus, it is easier for the driver to estimate the distance between the preceding vehicle 52 and the vehicle 12 from the index angle θ.

In the present exemplary embodiment, the CPU 10A changes the index angle θ continuously in accordance with distances between the vehicle 12 and the preceding vehicle 52. Therefore, the driver may visually perceive a relative speed of the vehicle 12 and the preceding vehicle 52. Thus, the driver may easily perceive whether the vehicle 12 and the preceding vehicle 52 are getting closer together or getting further apart.

In the present exemplary embodiment, the CPU 10A changes the size of the marker 56 in accordance with distances between the vehicle 12 and the preceding vehicle 52, and sets the size of the marker 56 to be constant relative to the preceding vehicle 52. Therefore, as seen by the driver, the marker 56 superimposed on the preceding vehicle 52 is displayed smaller when the preceding vehicle 52 is further from the vehicle 12, and the marker 56 superimposed on the preceding vehicle 52 is displayed larger when the preceding vehicle 52 is closer to the vehicle 12.

In the present exemplary embodiment, the CPU 10A displays the marker 56 on the display surface 26 that is visible to the driver. Thus, the marker 56 is displayed on the display surface 26 so as to be superimposed on the preceding vehicle 52. As a result, the driver may easily understand a relationship between the preceding vehicle 52 and the marker 56.

In the present exemplary embodiment, as shown in FIG. 1, the display surface 26 structures the portion of the head-up display 22 that the driver can see. Therefore, the driver may ascertain the relationship between the marker 56 and the preceding vehicle 52 while keeping their eyeline toward the vehicle front side.

In the present exemplary embodiment, static objects may be excluded from being targets. Furthermore, because the shape of the marker 56 is set to be a frame surrounding the preceding vehicle 52, the driver is more likely to have their attention drawn to the preceding vehicle 52.

In the present exemplary embodiment, as illustrated in FIG. 6 and FIG. 7, the CPU 10A acquires a running path of the vehicle 12, specifies the course change position 54 on the running path as a target, and sets the shape of the marker 62 to a shape indicating a progress direction of the vehicle 12. Therefore, the driver may perceive the course change position 54 on the running path from the marker 62 and may perceive the progress direction at the course change position 54 by seeing the marker 62. The apparent angle of the marker 62 relative to the road surface 60 changes in accordance with the distance between the course change position 54 and the vehicle 12. Consequently, the driver may understand distances between the course change position 54 and the vehicle 12.

Thus, the display control device 10, a display method and a non-transitory computer readable recording medium recording a display program according to the present exemplary embodiment may enable easy attainment of a sense of distance between the vehicle 12 and a target as seen by a driver of the vehicle 12.

Variant Example of the Exemplary Embodiment

In the exemplary embodiment described above, a marker is displayed on the display surface 26 of the front windshield 24 such that the marker is superimposed on a target seen through the display surface 26, but this is not limiting.

Figure 10:
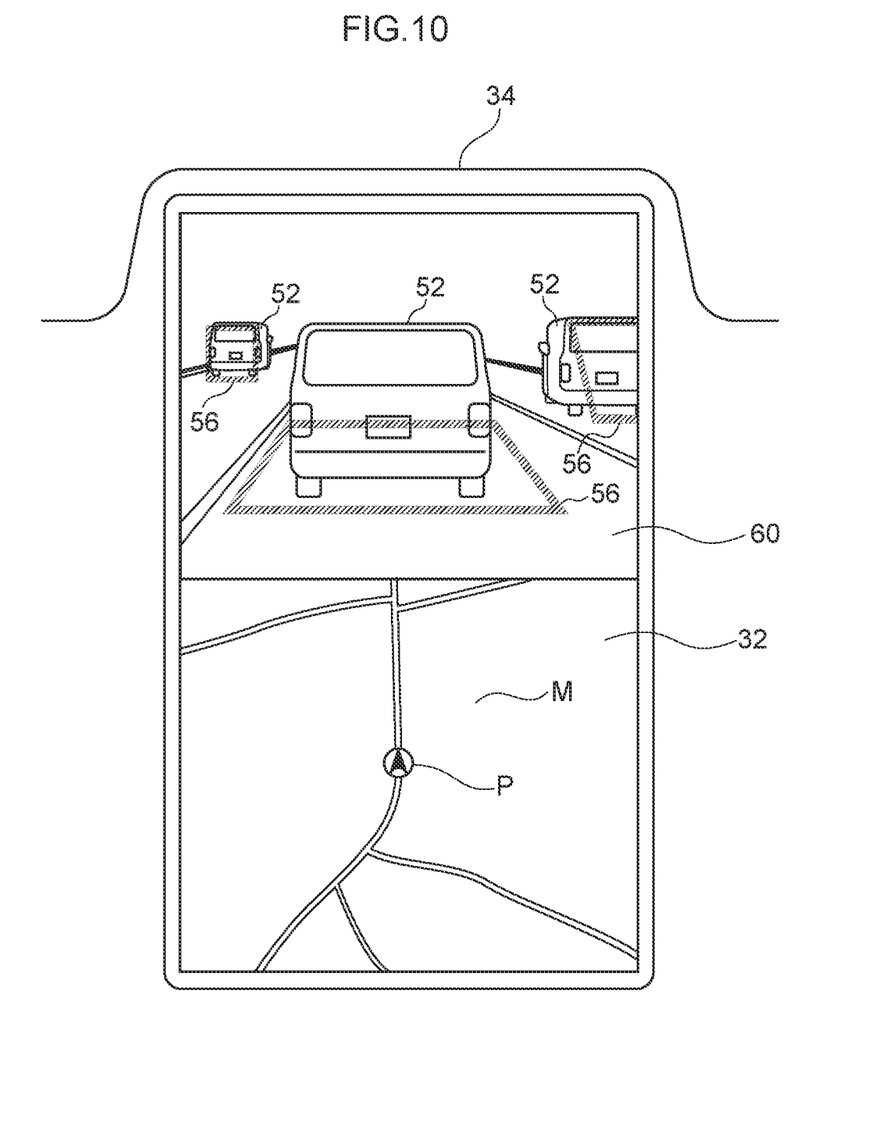
FIG. 10 is a schematic view showing a configuration of a vehicle display device according to a variant example of the present exemplary embodiment.

That is, depending on specifications of the vehicle 12 and the like, the center display 32 may function as a display screen as illustrated in FIG. 10. An image of a view to the front of the vehicle 12 including a target imaged by the external camera of the external sensors 36 may be displayed at the center display 32, and a marker may be displayed superimposed on the target in this image. In this configuration, the apparent angle of the marker is set relative to a predetermined viewpoint regardless of the eyeline direction of the driver.

Supplementary Descriptions of the Exemplary Embodiment (1) In the exemplary embodiment described above, the display apparatus 14 is installed in a right-hand drive vehicle, but the location of the display surface 26 and the like may be modified and the display apparatus 14 may be installed in a left-hand drive vehicle.

(2) In the exemplary embodiment described above, markers are displayed on the display surface 26 but, depending on specifications of the vehicle 12 and the like, a configuration is possible in which markers are displayed stereoscopically by a stereoscopic display device equipped with a concave mirror. Furthermore, shapes of the markers are not limited by the above descriptions; various shapes may be employed.

(3) In the exemplary embodiment described above, the eyeline direction of a driver is included in factors that are referred to when setting the position and apparent angle of a marker to be displayed on the display surface 26, but this is not limiting. For example, depending on specifications of the vehicle 12 and the like, the position and apparent angle of a marker to be displayed on the display surface 26 may be set by reference to a standard eye point.

(4) In the exemplary embodiment described above, the CPU 10A loads and executes various kinds of software (programs), but this is not limiting. That is, the various processes executed by the CPU 10A may be executed by various kinds of processor other than a CPU. Examples of processors in these cases include a PLD (programmable logic device) in which a circuit configuration can be modified after manufacturing, such as an FPGA (field programmable gate array) or the like, a dedicated electronic circuit which is a processor with a circuit configuration that is specially designed to execute specific processing, such as an ASIC (application-specific integrated circuit) or the like, and so forth. The processing described above may be executed by one of these various kinds of processors, and may be executed by a combination of two or more processors of the same or different kinds (for example, plural FPGAs, a combination of a CPU with an FPGA, or the like). Hardware structures of these various kinds of processors may be, for example, electronic circuits combining circuit components such as semiconductor components and the like.

(5) The exemplary embodiment described above is described with programs relating to various kinds of control being memorized in advance (installed) on a computer readable non-transitory recording medium, but this is not limiting. For example, the programs may be provided in a mode of being recorded on a non-transitory recording medium such as a CD-ROM (compact disc read-only memory), DVD-ROM (digital versatile disc read-only memory), USB (universal serial bus) memory or the like. The programs may also be downloaded from external equipment via a network.

(6) The processing of the exemplary embodiment described above may be executed not just by a single processor but also by a number of processors working together. The flows of processing described in the above exemplary embodiment are examples. Unnecessary steps may be removed, new steps may be added, and processing sequences may be rearranged within a scope not departing from the gist of the disclosure.

An object of the present disclosure is to provide a display control device for a vehicle, a display method, and a non-transitory computer readable recording medium recording a display program that each enable easy attainment of a sense of distance between the vehicle and a target as seen by a driver of the vehicle.

A first aspect of the present disclosure is a display control device for a vehicle, the display control device includes: a memory; and a processor connected to the memory, the processor being configured to: detect a target ahead of a vehicle; set an apparent angle of a marker relative to a reference plane in accordance with a distance between the target and the vehicle, the reference plane being related to a road surface on which the vehicle is traveling; and display the marker so as to be superimposed on the target as viewed by a driver of the vehicle.

According to the first aspect, the processor detects a target in front of the vehicle. The processor displays the marker so as to be superimposed on the target as seen by a driver of the vehicle.

If the display of the marker were uniform regardless of the distance between the vehicle and the target, a driver of the vehicle would probably have difficulty attaining a sense of distance between the vehicle and the target.

In the present aspect, however, an apparent angle of the marker relative to the reference plane, which is related to the road surface on which the vehicle is running, is set by the processor in accordance with the distance between the target and the vehicle. Consequently, a driver of the vehicle may estimate the distance between the target and the vehicle from this angle.

A second aspect of the present disclosure is the display control device for a vehicle according to the first aspect, wherein the processor is configured to: set the reference plane to the road surface; set the apparent angle to an index angle having a magnitude that is no larger than a right angle, the index angle being an angle between the marker and the road surface; decrease the index angle in conjunction with a decrease in the distance between the vehicle and the target; and increase the index angle in conjunction with an increase in the distance between the vehicle and the target.

According to the second aspect, the processor sets the road surface on which the vehicle is running as the reference plane, and sets the apparent angle of the marker relative to the reference plane to an index angle that has a magnitude less than a right angle (90°) and that is the angle to be formed between the marker and the road surface.

As the distance between the vehicle and the target shortens, the processor reduces the index angle, and as the distance between the vehicle and the target lengthens, the processor increases the index angle. Consequently, in the present disclosure, distances from the vehicle to the target may be represented by the marker with effects on visibility of the marker being suppressed.

A third aspect of the present disclosure is the display control device for a vehicle according to the second aspect, wherein the processor is configured to set the index angle to a right angle in response to the distance between the vehicle and the target being at least a predetermined distance.

According to the third aspect, as described above, the processor may reduce the index angle as the distance between the vehicle and the target shortens and may increase the index angle as the distance between the vehicle and the target lengthens.

In a situation in which no threshold is set for the distance between the vehicle and the target, when the index angle is changed in accordance with the distance between the vehicle and the target, changes in the index angle with respect to changes in the distance are small. Thus, a driver of the vehicle could have difficulty attaining a sense of distance between the vehicle and the target.

In the present aspect, the processor sets the index angle to the right angle when the distance between the vehicle and the target is at least the predetermined distance. Therefore, a driver of the vehicle sees a state in which the index angle is the right angle when the distance between the vehicle and the target is the predetermined distance or greater. Thus, the driver may perceive that the distance between the vehicle and the target is the predetermined distance or greater.

When the distance between the vehicle and the target is less than the predetermined distance, amounts of change of the index angle with respect to changes in the distance between the vehicle and the target are assured. Thus, it is easier for the driver of the vehicle to estimate the distance between the target and the vehicle from the index angle.

A fourth aspect of the present disclosure is the display control device for a vehicle according to the second aspect or third aspect, wherein the processor is configured to change the index angle continuously in accordance with the distance between the vehicle and the target.

According to the fourth aspect, the processor changes the index angle continuously in accordance with distances between the vehicle and the target. Therefore, a driver of the vehicle may visually perceive a relative speed of the vehicle and the target. Thus, the driver may easily perceive whether the vehicle and the target are getting closer together or getting further apart.

A fifth aspect of the present disclosure is the display control device for a vehicle according to any one of the first aspect to the fourth aspect, wherein the processor is configured to: change a size of the marker in accordance with the distance between the vehicle and the target, and set the size of the marker to be constant relative to the target.

According to the fifth aspect, the processor changes the size of the marker in accordance with distances between the vehicle and the target, and sets the size of the marker to be constant relative to the target. Therefore, as seen by a driver of the vehicle, the marker superimposed on the target is displayed smaller when the target is further from the vehicle, and the marker superimposed on the target is displayed larger when the target is closer to the vehicle.

A sixth aspect of the present disclosure is the display control device for a vehicle according to any one of the first aspect to the fifth aspect, wherein the processor is configured to display the marker at a display surface that is visible to the driver.

According to the sixth aspect, the processor displays the marker on the display surface that is visible to the driver of the vehicle. Thus, the marker is displayed on the display surface so as to be superimposed on the target. As a result, the driver of the vehicle may easily understand a relationship between the target and the marker.

A seventh aspect of the present disclosure is the display control device for a vehicle according to claim 6, wherein the display surface (26) configures a portion of a head-up display (22) that is visible to the driver.

According to the seventh aspect, the display surface structures the portion of the head-up display that the driver of the vehicle can see. Therefore, the driver may ascertain the relationship between the marker and the target while keeping their eyeline toward the vehicle front side.

An eighth aspect of the present disclosure is the display control device for a vehicle according to any one of the first aspect to the seventh aspect, wherein the processor is configured to: specify a moving body as the target; and set a shape of the marker to a frame surrounding the moving body.

According to the eighth aspect, static objects may be excluded from being targets. Furthermore, because the shape of the marker is set to be a frame surrounding a moving body, a driver of the vehicle is more likely to have their attention drawn to the moving body.

A ninth aspect of the present disclosure is the display control device for a vehicle according to any one of the first aspect to the eighth aspect, wherein the processor is configured to: acquire a travel path of the vehicle; specify a course change position on the travel path as the target; and set a shape of the marker to a shape indicating a progress direction of the vehicle.

According to the ninth aspect, the processor acquires a running path of the vehicle, specifies a course change position on the running path as the target, and sets the shape of the marker to the shape indicating a progress direction of the vehicle. Therefore, a driver of the vehicle may perceive the course change position on the running path from the marker and may perceive the progress direction at the course change position by seeing the marker. The apparent angle of the marker relative to the reference plane changes in accordance with the distance between the path change position and the vehicle. Consequently, the driver may understand distances between the course change position and the vehicle.

A tenth aspect of the present disclosure is a display method for a vehicle, the display method comprising, by a processor: detecting a target ahead of a vehicle; setting an apparent angle of a marker relative to a reference plane in accordance with a distance between the target and the vehicle, the reference plane being related to a road surface on which the vehicle is traveling; and displaying the marker so as to be superimposed on the target as viewed by a driver of the vehicle.

According to the tenth aspect, a target to the front of the vehicle is detected, and the apparent angle of the marker relative to the reference plane, which is related to the road surface on which the vehicle is running, is set in accordance with a distance between the target and the vehicle. Then, the marker is displayed so as to be superimposed on the target as seen by a driver of the vehicle. Consequently, the driver of the vehicle may estimate the distance between the target and the vehicle from the apparent angle of the marker relative to the reference plane.

An eleventh aspect of the present disclosure is a non-transitory computer readable recording medium recording a display program executable by a computer to perform processing, the processing comprising: detecting a target ahead of a vehicle; setting an apparent angle of a marker relative to a reference plane in accordance with a distance between the target and the vehicle, the reference plane being related to a road surface on which the vehicle is traveling; and displaying the marker so as to be superimposed on the target as viewed by a driver of the vehicle.

According to the eleventh aspect, similarly to the tenth aspect, the driver of the vehicle may estimate the distance between the target and the vehicle from the apparent angle of the marker relative to the reference plane.

A display control device for a vehicle, display method and non-transitory computer readable recording medium recording a display program relating to the present disclosure may enable easy attainment of a sense of distance between the vehicle and a target as seen by a driver of the vehicle.

What is claimed is:

1. A display control device for a vehicle, the display control device comprising:
a memory; and
a processor connected to the memory, the processor being configured to:
detect a target ahead of a vehicle;
set an apparent angle of a marker relative to a reference plane in accordance with a distance between the target and the vehicle, the reference plane being related to a road surface on which the vehicle is traveling;
display the marker so as to be superimposed on the target as viewed by a driver of the vehicle;
set the reference plane to the road surface;
set the apparent angle to an index angle having a magnitude that is no larger than a right angle, the index angle being an angle between the marker and the road surface;
decrease the index angle in conjunction with a decrease in the distance between the vehicle and the target;
increase the index angle in conjunction with an increase in the distance between the vehicle and the target;

set the index angle to a right angle in response to the distance between the vehicle and the target being at least a predetermined distance;
change a size of the marker in accordance with the distance between the vehicle and the target; and
set the size of the marker to be constant relative to the target.

2. The display control device for a vehicle according to claim 1, wherein the processor is configured to change the index angle continuously in accordance with the distance between the vehicle and the target.

3. The display control device for a vehicle according to claim 1, wherein the processor is configured to display the marker at a display surface that is visible to the driver.

4. The display control device for a vehicle according to claim 3, wherein the display surface configures a portion of a head-up display that is visible to the driver.

5. The display control device for a vehicle according to claim 1, wherein the processor is configured to:
specify a moving body as the target; and
set a shape of the marker to a frame surrounding the moving body.

6. The display control device for a vehicle according to claim 1, wherein the processor is configured to:
acquire a travel path of the vehicle;
specify a course change position on the travel path as the target; and
set a shape of the marker to a shape indicating a progress direction of the vehicle.

7. A display method for a vehicle, the display method comprising, by a processor:
detecting a target ahead of a vehicle;
setting an apparent angle of a marker relative to a reference plane in accordance with a distance between the target and the vehicle, the reference plane being related to a road surface on which the vehicle is traveling;
displaying the marker so as to be superimposed on the target as viewed by a driver of the vehicle;
setting the reference plane to the road surface;
setting the apparent angle to an index angle having a magnitude that is no larger than a right angle, the index angle being an angle between the marker and the road surface;
decreasing the index angle in conjunction with a decrease in the distance between the vehicle and the target;
increasing the index angle in conjunction with an increase in the distance between the vehicle and the target;
setting the index angle to a right angle in response to the distance between the vehicle and the target being at least a predetermined distances;
changing a size of the marker in accordance with the distance between the vehicle and the target; and
setting the size of the marker to be constant relative to the target.

8. A non-transitory computer readable recording medium recording a display program executable by a computer to perform processing, the processing comprising:
detecting a target ahead of a vehicle;
setting an apparent angle of a marker relative to a reference plane in accordance with a distance between the target and the vehicle, the reference plane being related to a road surface on which the vehicle is traveling;
displaying the marker so as to be superimposed on the target as viewed by a driver of the vehicle;
setting the reference plane to the road surface;
setting the apparent angle to an index angle having a magnitude that is no larger than a right angle, the index angle being an angle between the marker and the road surface;
decreasing the index angle in conjunction with a decrease in the distance between the vehicle and the target;
increasing the index angle in conjunction with an increase in the distance between the vehicle and the target;
setting the index angle to a right angle in response to the distance between the vehicle and the target being at least a predetermined distance;
changing a size of the marker in accordance with the distance between the vehicle and the target; and
setting the size of the marker to be constant relative to the target.

* * * * *